US010697435B2

(12) United States Patent
Ren et al.

(10) Patent No.: US 10,697,435 B2
(45) Date of Patent: Jun. 30, 2020

(54) ANTI-SWING DEVICE FOR OFFSHORE WIND TURBINE TOWER INSTALLATION

(71) Applicant: Dalian University of Technology, Dalian, Liaoning (CN)

(72) Inventors: Zhengru Ren, Liaoning (CN); Zhiyu Jiang, Liaoning (CN); Wei Shi, Liaoning (CN); Dezhi Ning, Liaoning (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/340,663

(22) PCT Filed: Sep. 11, 2017

(86) PCT No.: PCT/CN2017/101170
§ 371 (c)(1),
(2) Date: Apr. 9, 2019

(87) PCT Pub. No.: WO2019/047196
PCT Pub. Date: Mar. 14, 2019

(65) Prior Publication Data
US 2020/0048051 A1 Feb. 13, 2020

(51) Int. Cl.
F03D 13/10 (2016.01)
F03D 13/25 (2016.01)
B66C 13/06 (2006.01)

(52) U.S. Cl.
CPC ............ F03D 13/10 (2016.05); B66C 13/063 (2013.01); F03D 13/25 (2016.05)

(58) Field of Classification Search
CPC ....... B66C 13/063; F03D 13/25; F03D 13/10; F05B 2230/61
See application file for complete search history.

(56) References Cited

U.S. PATENT DOCUMENTS

2011/0221215 A1* 9/2011 Botwright ............... B66C 23/36
294/81.4
2015/0023790 A1* 1/2015 Friis ....................... F03D 13/40
415/213.1

(Continued)

FOREIGN PATENT DOCUMENTS

CN 102425530 A 4/2012
CN 104595125 A 5/2015

(Continued)

Primary Examiner — Sang K Kim
Assistant Examiner — Nathaniel L Adams
(74) Attorney, Agent, or Firm — Muncy, Geissler, Olds & Lowe, P.C.

(57) ABSTRACT

An anti-swing device for offshore wind turbine tower installation which reduces pendular motion of the tower component during mating process. Subsystems are at the transition piece, tower, and bridge. Winches are arranged on and fixed to the tower's inner wall and connected through cables. A remote signal transceiver and acquisition controller are arranged and fixed to the tower's inner wall. The transceiver controls the connector at the tower end and servo winch motors which control the cables to adjust the position of the suspended tower component. The controller acquires tension signals on the cables from the tower and transmits signals to the transceiver. Acceleration sensors are included in the acquisition controller. Several connector are included in the tower end and fixed at the bottom of the tower component. The number of connectors is the same as winches at the transition piece and their positions correspond.

3 Claims, 2 Drawing Sheets

(56) References Cited

U.S. PATENT DOCUMENTS

2016/0176682 A1* 6/2016 Del Pozo Polidoro ...................... B66C 13/08
                                                                    254/294
2017/0050824 A1* 2/2017 Fenger .................. B66C 23/185
2018/0290864 A1* 10/2018 Garitaonandia Aramberri ............
                                                                    F03D 13/10

FOREIGN PATENT DOCUMENTS

| CN | 205527421 U | 8/2016 |
| CN | 107355351 A | 11/2017 |
| CN | 207229308 U | 4/2018 |
| EP | 2275340 A2 | 1/2011 |

* cited by examiner

ANTI-SWING DEVICE FOR OFFSHORE WIND TURBINE TOWER INSTALLATION

TECHNICAL FIELD

This invention belongs to the field of offshore wind turbine technology. It is especially an anti-roll device is applied to fixed offshore wind turbine tower assembly process.

BACKGROUND

Due to the growing wind turbine size, preassembly strategy cannot meet the installation demands anymore. Wind turbine components assembled separately is necessary. For the wind turbine tower installation, traditional methods rely mainly on experience and manual adjustments. When the wind speed and other weather factors meet the lifting requirements, the tower is lifted from the deck to a certain height and then moved horizontally by the crane to the position above the installation location. When the motion of the tower meets the specific requirements, the lift wire is released gradually. At the same time, continuous attentions are paid to the motion of the tower to ensure that its amplitude is within the operational limit. When the tower is close to the transition piece, the crew working at the transition piece manually cooperated with the crane to ensure the tower settles on the tower smoothly. Then the tower is fixed by the mounting screws. If the magnitude of the tower swing increases due to the high wind loads, stop lowering until the motion is within the operational limit. If the swing motion is too large, the tower is lowered to the deck. The aforementioned steps are repeated until the allowable weather.

This conventional installation method is limited by the environmental conditions. The operation time is long with a high cost. Additionally, the life safety of the crew is threatened due to the lack of protection. The dependence on environmental conditions and the swing of the tower will be greatly reduced if the anti-swing device is used during the installation process. Thus, the risk of damaging the tower is reduced and the installation efficiency is improved.

SUMMARY

The object of the present invention, an anti-swing device for the offshore wind turbine tower installation, is to overcome the aforementioned drawbacks of conventional wind turbine tower installation method. The pendular motion of the suspended tower unit will be greatly reduced during the installation process.

The technical proposal of the invention:

An anti-swing device used for the installation of offshore for wind turbine tower component is designed to prevent the pendular oscillation of the tower during the installation process. The entire system includes three subsystems located at the transition piece, tower, and bridge, respectively.

The proposed subsystem at the tower includes the anti-swing winch servo motors 11, cables 12, connectors at the tower 13, power supply 14, remote signal transceiver 15, acquisition controller 16, and power cord 17. Several anti-swing winch servo motors 11 spreadly arranged, fixed to the inner wall of the tower, and connected to the connectors at the tower 13 by cables 12; remote signal transceiver 15 and the acquisition controller 16 are fixed to the inner wall of the tower. The remote signal transceiver 15 controls tower end connectors at the tower 13, and then control cables 12 to adjust the orientation and position of the tower 4 by anti-swing winch servo motors 11. The described acquisition controller 16 collects the tension measurements on the cables 12 and send the signals to the remote signal transceiver 15. The acquisition controller 16 contains an acceleration sensor. The power of all the equipment described above is provided by the supply 14 through the power cord 17.

The proposed subsystem at the transition piece includes the connectors at the transition piece 10. The connectors at the transition piece 10 are fixed at the bottom of the tower, and its number is same to the anti-swing winch servo motors 11. The positions of the connectors at the transition piece 10 and the anti-swing winch servo motors 11 are one-to-one correspondence.

The proposed subsystem at the bridge includes a user interface and the wireless transceiver. The device at the transition piece is controlled through the user interface. The wireless signal is transmitted to the remote signal transceiver 15 used for controlling the connectors at the tower 13 and then anti-swing winch servo motors 11 to release and tighten the cables 12. Consequently, the orientation and position of the tower 4 will be well adjusted. The data measured and transmitted to the bridge include the position measurements of all the winch servo motor 11, connectors at the transition piece 10, and connectors at the tower 13; The length of all cables 12; the tension on the cable 12; the changing rates of all cables 12; the releasing/tightening length of all the cables 12; connection status of all connectors, the power-supply information; system faults and failures; predefined tension limitations; warning of large tension. Furthermore, the controller should have the manual/automated tension allocation based on the tower motion.

The proposed anti-swing winch servo motor 11 has a load cell to measure the tension on the cable 12 and is powered by the independent power-supply 14 located at the tower 4. An independent power-supply 14 has the backup power supply function. When the main power supply fails, the emergency power supply will be turned on to protect the system safety and the installation is continued. Additional independent power supply for the wireless receiver inside of the controller is required to guarantee the communication with the bridge in case of system faults and failures.

The anti-swing winch servo motors 11 should have a protection functionality in case of power failure. When the power supply interrupts, the length of cables 12 should be unchanged.

The connectors at the transition piece 10 is assembled to the corresponding places at the time of leaving the factory. They should be rigidly fixed by the protection devices without displacement in case of the risk of crew safety and damages to the structures within system failures. Special devices or unlocking operations are needed for unlocking.

The connectors at the transition piece 13 can be connected with the connectors at the tower 10. A protection functionality is required after connection in case of the risk of crew safety and damages to the structures. Special devices or unlocking operations are needed for unlocking. Warning of the connection completion is received by the operators in the bridge when the connectors are locked.

The number of the anti-swing winch servo motors 11 and the corresponding connectors is selected depending on the sea states and wind turbine tower. The installation time is reduced and the overall efficiency is improved with a small number of winches in calm seas. On the other hand, more cables can be utilized in higher sea states to improve the operation security.

All equipment should be waterproof, dustproof, and quakeproof.

Invention Advantages

The equipment is installed at the tower, during the manufacture or waiting period. Therefore, the offshore installation time can be controlled. The connectors at the transition piece are easy to assembled, and the connection operation is easy to execute.

The existing installation approaches reduce the swing motion using the horizontal tugger lines. The invention can cooperated with the existing installation methods. Moreover, the present invention increases the system constraints, enhance the level of automation, protects security, and extends the operation restrictions.

This invention significantly improves the load carrying capacity during wind turbine tower installation. The installation of the wind turbine tower can be realized in higher sea states with a more efficiently use of the installation vessel, resulting a lower installation cost. Since no manual intervention is needed during the closure process, the number of the crew on the tower can be reduced. Therefore, the operation safety can be improved.

After the mating operation, the cables are in tension which improves the stability of tower and reduce the risk of crew safety.

Figure 1:
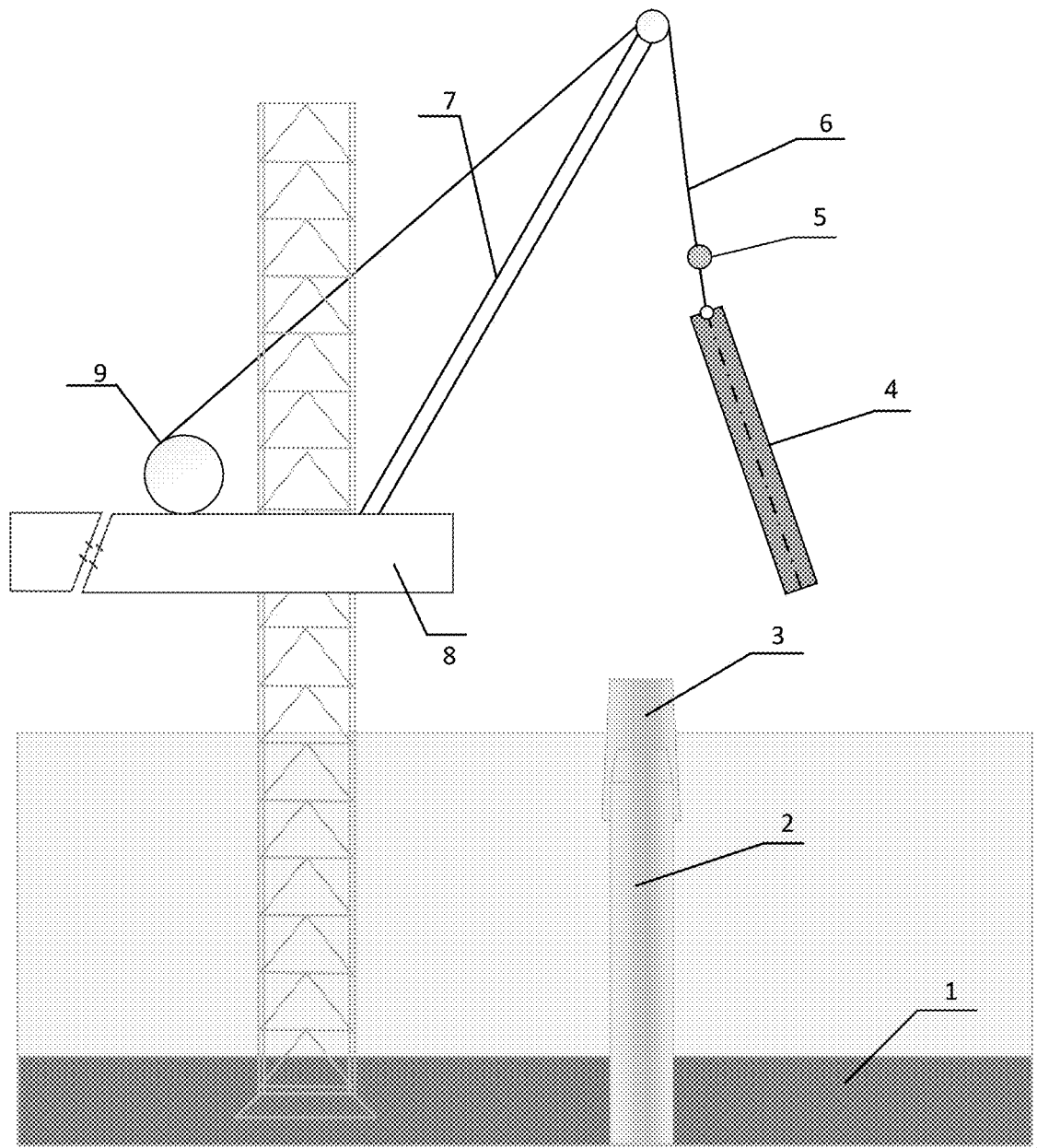
FIG. 1 is a schematic view of a wind turbine tower installation.
Figure 2:
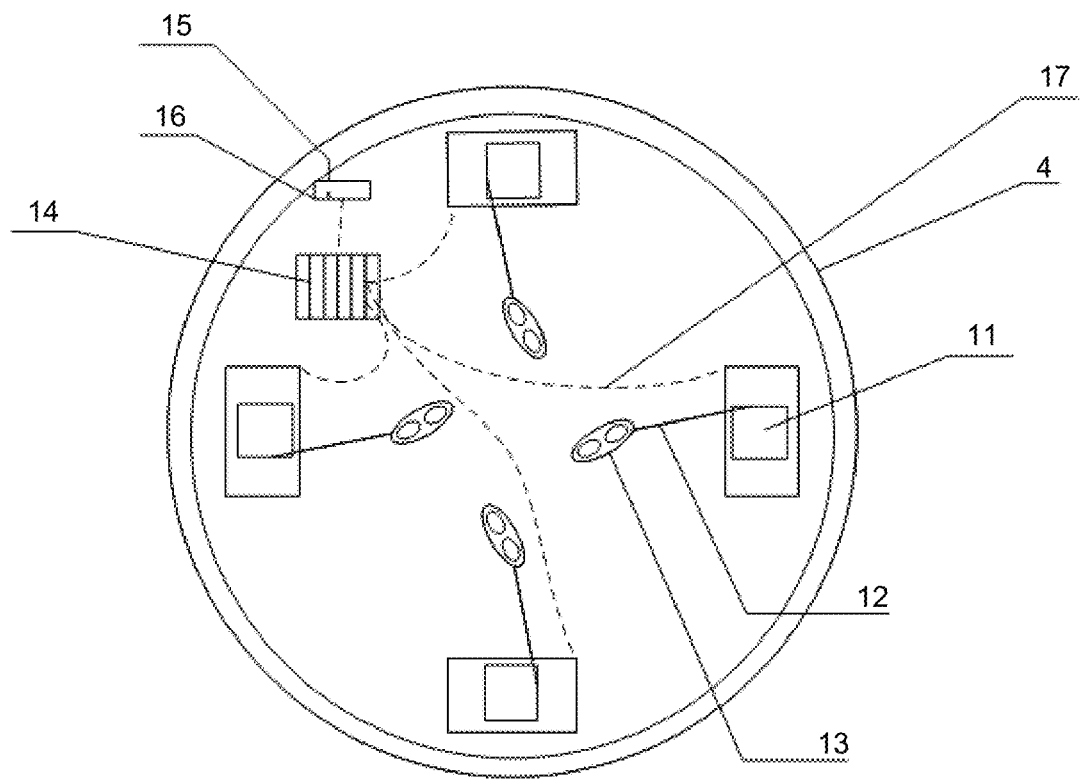
FIG. 2 is a schematic view of the subsystem at the tower.
Figure 3:
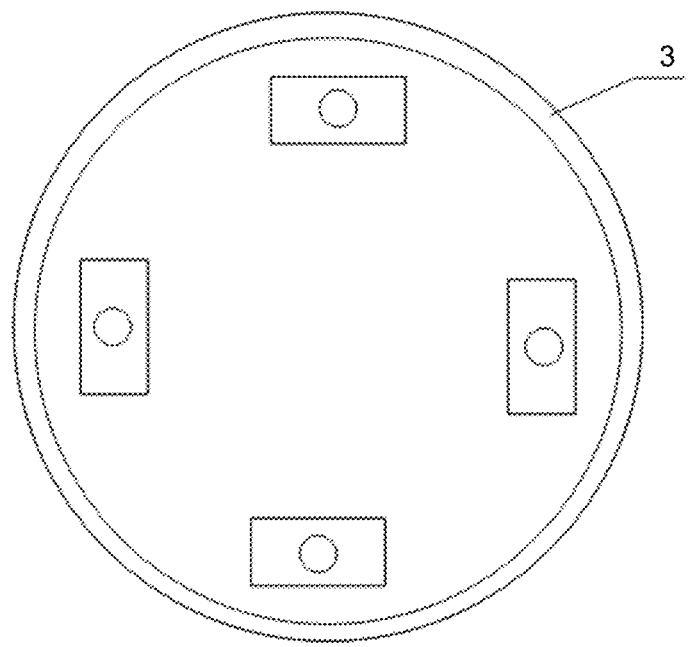
FIG. 3 is a schematic diagram of the subsystem at the foundation.

In the FIG. 1 seabed; 2 monopile foundation; 3 transition piece; 4 tower; 5 hook; 6 lift wire; 7 crane; 8 jackup platform; 9 winch; 10 connector at the transition piece; 11 anti-swing winch servo motor; 12 cable; 13 connector at the tower; 14 power supply; 15 signal transceiver; 16 acquisition controller; 17 power cord.

DETAILED DESCRIPTION

Accompanying with the attached drawings and the technical solutions, further descriptions will be given below:

The position for power supply 14, anti-swing winch servo motors 11 and connectors should be well prepared during the fabrication. when the wind turbine transition piece 3 and tower 4 are produced. Anti-swing winch servo motors 11 can be assembled when leaving the factory or on the vessel before the lifting. Cables 12 and connectors at the tower 13 are assembled after the anti-swing winch servo motors 11. Retract the cables 12 by controlling the anti-swing winch servo motors 11 to prevent the damages and impacts to the crew, equipment, and structure during the lift caused by the swing of the cables 12 and connector at the tower 13.

If the transition piece 3 has been installed, the tower 4 is lifted from the deck to a certain height, and then horizontally move to the position above the installation site. Cables 12 are released by controlling the anti-swing winch servo motors 11. When the connectors at the tower 13 fall to the same height of the transition piece 3, release the cables 12 continuously to ensure that the cables 12 are in a state of relaxation when the connectors at the tower 13 and connectors at the transition piece 10 are connected. When the connection is completed, manually/automatically control the anti-swing winch servo motors 11 to tighten the cables 12 until the cables 12 are tensioned all the time. The tension should be always more than zero. Slowly lower the tower 4 and keep the cables 12 between the tower 4 and transition piece 3 tightening until the successful assembly. Fasten the mounting screws. Next, demount the anti-swing winch servo motors 11, power supply 14, cables 12, and connectors at the tower 13 for future reuse.

If the measured tension approaches to the predefined limits, reduce the tension or cancel the installation.

We claim:

1. An anti-swing device for offshore wind turbine tower installation, wherein the device reduces wobble of the swing and pendular motion during an initialization process, including three subsystems which are located at a tower, a transition piece, and a bridge, respectively;

the subsystem at the tower includes anti-swing winch servo motors, cables, connectors at the tower, a power supply, a remote signal transceiver, an acquisition controller, and a power cord; several anti-swing winch servo motors spreadly arranged, fixed to the inner wall of the tower, and connected to the connectors at the tower by cables; the remote signal transceiver and the acquisition controller are fixed to an inner wall of the tower; the remote signal transceiver controls tower end connectors at the tower, and then control cables to adjust the orientation and position of the tower by the anti-swing winch servo motors; the acquisition controller collects tension measurements on the cables and send signals to the remote signal transceiver; the acquisition controller contains an acceleration sensor; the power of all the equipment described above is provided by the power supply through the power cord;

the subsystem at the transition piece includes connectors at the transition piece; the connectors at the transition piece are fixed at a bottom of the tower, and the number of connectors is the same as the anti-swing winch servo motors; positions of the connectors at the transition piece and the anti-swing winch servo motors are one-to-one correspondence;

the subsystem at the bridge includes a user interface and a wireless transceiver; the device at the transition piece is controlled through the user interface; a wireless signal is transmitted to the remote signal transceiver used for controlling the connectors at the tower and the anti-swing winch servo motors to release and tighten the cables; consequently, the orientation and position of the tower will be well adjusted.

2. The anti-swing device for offshore wind turbine tower installation of claim 1, wherein the anti-swing winch servo motor has a load cell; the anti-swing winch servo motors are powered by an independent power supply located at the tower.

3. The anti-swing device for offshore wind turbine tower installation of claim 1, wherein a selection of the number of the anti-swing winch servo motors and the connectors at the tower is decided by the weather conditions.

* * * * *